(12) United States Patent
Yazaki et al.

(10) Patent No.: US 7,744,290 B2
(45) Date of Patent: Jun. 29, 2010

(54) OPTICAL FIBER CONNECTOR

(75) Inventors: Akihiko Yazaki, Tokyo (JP); Takaya Yamauchi, Tokyo (JP); Tomoyasu Oike, Tokyo (JP); Masanobu Toyonaga, Tsukuba (JP); Kuniaki Terakawa, Tsukuba (JP); Hiroyuki Tanase, Tsukuba (JP); Tatsuya Nakajima, Tsukuba (JP); Masashi Awamori, Tsukuba (JP)

(73) Assignees: 3M Innovative Properties Company, St. Paul, MN (US); Nippon Telegraph and Telephone Corporation, Tokyo (JP)

( * ) Notice: Subject to any disclaimer, the term of this patent is extended or adjusted under 35 U.S.C. 154(b) by 134 days.

(21) Appl. No.: 12/091,640

(22) PCT Filed: Oct. 30, 2006

(86) PCT No.: PCT/US2006/042172
§ 371 (c)(1),
(2), (4) Date: Aug. 13, 2008

(87) PCT Pub. No.: WO2007/053496
PCT Pub. Date: May 10, 2007

(65) Prior Publication Data
US 2009/0220199 A1    Sep. 3, 2009

(30) Foreign Application Priority Data
Oct. 31, 2005 (JP) .............................. 2005-316304

(51) Int. Cl.
G02B 6/38    (2006.01)
G02B 6/36    (2006.01)
(52) U.S. Cl. .............................. 385/73; 385/55; 385/58; 385/70

(58) Field of Classification Search ................... 385/53, 385/55, 56, 58, 60, 66, 67, 70, 72, 73
See application file for complete search history.

(56) References Cited

U.S. PATENT DOCUMENTS 4,325,607 A    4/1982    Carlsen (Continued)

FOREIGN PATENT DOCUMENTS

JP    UM 3022015    12/1995

(Continued)

*Primary Examiner*—Uyen-Chau N Le
*Assistant Examiner*—Rhonda S Peace
(74) *Attorney, Agent, or Firm*—Gregg H. Rosenblatt

(57) ABSTRACT

The optical fiber connector includes a connector housing (21), having a splice assembly (13) therein, and an end cap (5) attached to one end of the connector housing (21), from which leads out a primary coating portion (3). A boundary (4c) between a portion of the primary coating portion (3), obtained by removing an outer coating (4b) of the inner cover (4) while leaving an inner coating (4a), and a portion obtained by leaving the outer coating (4b) of the inner cover (4), is located in the interior of the connector housing (21). The end cap (5) is provided in the interior thereof with a tubular portion and an extension extending from an end of the tubular portion, the tubular portion including an insert hole for an insertion of the primary coating portion (3) approximately coaxially with a guiding hole formed in the splice assembly accommodated in the connector housing (21) for guiding the primary coating portion (3) leading out from the splice assembly. The extension includes a strain-control hole, communicating with the insert hole, for receiving said boundary (4c) of the primary coating portion (3), and for controlling stress at the boundary (4c).

4 Claims, 3 Drawing Sheets

U.S. PATENT DOCUMENTS

| | | |
|---|---|---|
| 5,005,942 A | 4/1991 | Barlow et al. |
| 5,040,867 A | 8/1991 | de Jong et al. |
| 5,189,717 A | 2/1993 | Larson et al. |
| 5,732,174 A | 3/1998 | Carpenter et al. |
| 5,761,360 A | 6/1998 | Grois et al. |
| 5,812,718 A | 9/1998 | Carpenter et al. |
| 5,993,070 A | 11/1999 | Tamekuni et al. |
| 6,773,167 B2 | 8/2004 | Scanzillo |
| 6,816,661 B1 | 11/2004 | Barnes et al. |
| 6,848,838 B2 | 2/2005 | Doss et al. |
| 6,870,996 B2 | 3/2005 | Doss et al. |
| 7,011,454 B2 | 3/2006 | Caveney et al. |
| 7,140,787 B2 | 11/2006 | Yamauchi et al. |
| 7,454,117 B2 | 11/2006 | Carpenter et al. |
| 7,178,990 B2 | 2/2007 | Caveney et al. |
| 7,270,487 B2 | 9/2007 | Billman et al. |
| 7,280,733 B2 | 10/2007 | Larson et al. |
| 7,331,718 B2 | 2/2008 | Yazaki et al. |
| 7,369,738 B2 | 5/2008 | Larson et al. |
| 2005/0063662 A1 | 3/2005 | Carpenter et al. |
| 2005/0238292 A1 | 10/2005 | Barnes et al. |
| 2007/0133926 A1 | 6/2007 | Semmler et al. |
| 2007/0147741 A1 | 6/2007 | Meek et al. |
| 2007/0172179 A1 | 7/2007 | Billman et al. |

FOREIGN PATENT DOCUMENTS

| | | |
|---|---|---|
| JP | 11-064683 | 3/1999 |
| JP | 3445479 B2 | 6/2003 |
| JP | 2005-140989 A | 6/2005 |
| WO | WO 2006/019515 A1 | 2/2006 |
| WO | WO 2006/019516 A1 | 2/2006 |
| WO | WO 2007/053546 A1 | 5/2007 |

OPTICAL FIBER CONNECTOR

CROSS REFERENCE TO RELATED APPLICATIONS

This application is a national stage filing under 35 U.S.C. 371 of PCT/US2006/042172, filed Oct. 30, 2006, which claims priority to Japanese Application No. 2005-316304, filed Oct. 31, 2005, the disclosure of which is incorporated by reference in its entirety herein.

TECHNICAL FIELD

The present invention relates to an optical fiber connector, having a splice assembly therein, for optically connecting together end surfaces of plain fiber portions, from each of which has been removed a cover of the optical fiber cable, while abutting the end surfaces to each other.

BACKGROUND

In general, an optical fiber connector having a splice assembly therein for optically connecting end surfaces of plain fiber portions, from each of which has been removed a cover of the optical fiber cable, while abutting the end surfaces to each other, has been conveniently used at a work-site for easily connecting optical fiber cables to each other, as disclosed in Japanese Patent No. 3445479.

Japanese Patent No. 3445479 discloses a so-called mechanical-splice-type optical fiber connector comprising a splice assembly for holding a ferrule having a primary coating portion and an extension of the primary coating portion leading out from a rear end surface of the ferrule, wherein a primary coating portion of an optical fiber cable is guided into the splice assembly from an end thereof so that end surfaces of the plain fiber portions are abutted to each other and optically connected to each other.

Such an optical fiber connector is used, for example, when a domestic data communication service is provided through optical fibers, and is stored in an optical communication junction box of a predetermined size provided on a telephone pole or in a residence. The optical communication junction box also has optical fiber cables and optical devices other than the optical fiber connector. On a side of the optical fiber connector from which the optical fiber is led out, the optical fiber cable may be guided via a boot member for avoiding abrupt bending of the optical fiber cable.

As optical fiber data communication services have become popular, the number of optical devices used therefor has increased, whereby the vacant space within the optical communication junction box has been reduced. Accordingly, it is desired to miniaturize the optical fiber connector to be accommodated in the optical communication junction box. When the boot member is mounted to a wall of the optical fiber connector, however, there is a problem in that a side of the optical fiber connector from which the optical fiber leads out is protruded to substantially enlarge the size of the optical fiber connector, which again reduces vacant space available within the box. To solve such a problem, a countermeasure has been demanded wherein the optical fiber can be bent within the connector and without using the boot member.

On the other hand, a proposal has been made wherein the primary coating portion is covered solely with a thin inner coating to increase the vacant space within the box because it would be unnecessary to cover the outer circumference of the primary coating portion with a thick coating of, for example, polyethylene, within the optical communication junction box. In this case, the primary coating portion with, for example, a diameter of 0.25 mm suitably has a multi-layered structure covered with a thin coating for the purpose of facilitating handling and/or visibility.

FIG. 5 illustrates one example of the prior arts cited as a comparison with the present invention. In the drawing, when a splice assembly 33 stored within an optical fiber connector 30 corresponds to a primary coating portion of 0.25 mm diameter, an outer coating of the primary coating portion 31 having a diameter larger than 0.25 mm is removed by using a skin peeling tool, or another tool, until the diameter becomes 0.25 mm. A boundary 32, at which the diameter of the primary coating portion 31 changes, is protected within the interior of the optical fiber connector 30.

However, as the boundary 32 of the optical fiber core 31 has a step at which the diameter changes, there is a risk in that stress is concentrated at the boundary 32 if the primary coating portion 31 is bent within the interior of the connector 30, resulting in a bending loss of optical signal or breakage of the primary coating portion.

SUMMARY

Accordingly, the present invention is aimed to provide, when a boundary corresponding to a stepped portion of an inner cover of a primary coating portion is located inside of an optical fiber connector, an optical fiber connector capable of avoiding stress concentration at the boundary to prevent breakage of the primary coating portion.

Means for Solving the Problems

To solve the above-mentioned problem, according to claim 1 of the present invention, an optical fiber connector, comprising a connector housing having a splice assembly therein, for abutting an end surface of a plain fiber portion, obtained by removing an outer cover and a multi-layered inner cover from an optical fiber cable, to an end surface of a mating plain fiber portion and optically connecting plain fiber portions to each other, and an end cap, attached to one end of said connector housing, from which a primary coating portion, obtained by removing the outer cover of said optical fiber cable while leaving the inner cover thereof, is led out, wherein a boundary formed on said primary coating portion, between a portion of said primary coating portion, obtained by removing an outer coating while leaving an inner coating of the inner cover, and a portion leaving the outer coating of the inner cover, is located in an interior of said connector housing, characterized in that said end cap is provided in the interior thereof with a tubular portion and an extension extending from an end of said tubular portion, said tubular portion including an insert hole for an insertion of said primary coating portion approximately coaxially with a guiding hole formed in said splice assembly accommodated in said connector housing for guiding said primary coating portion leading out from said splice assembly, said extension including a strain-control hole, communicating with said insert hole, for receiving said boundary of said primary coating portion, and for controlling stress at said boundary.

According to claim 2 of the present invention, an optical fiber connector as defined by claim 1 is characterized in that said extension is located in said guiding hole.

According to claim 3 of the present invention, an optical fiber connector as defined by claim 1 or 2 is characterized in that said strain-control hole is a straight hole.

According to claim 4 of the present invention, an optical fiber connector as defined by any one of claims 1 to 3 is characterized in that a tapered portion is formed on primary coating portion leading out side of said insert hole; said tapered portion having a diameter gradually increasing toward an open end.

EFFECTS OF THE INVENTION

According to the invention defined by claim 1, as the strain-control hole communicating with the insert hole is provided in the extension of the tubular portion, even if the primary coating portion is bent at a position outside the end cap, the influence of the bending upon the boundary is mitigated to minimize the strain at the boundary. Thus, the concentration of stress at the boundary is avoided to prevent the primary coating portion from breaking, whereby the reliability of the optical connection is enhanced.

According to the invention defined by claim 2, as the extension is located within the guiding hole, it is possible to assuredly protect the boundary of the primary coating portion in a wide range.

According to the invention defined by claim 3, as the strain-control hole is a straight hole, the strain of the primary coating portion in the vicinity of the boundary is restricted to assuredly avoid the influence of the bending upon the boundary.

According to the invention defined by claim 4, as the tapered portion is formed in the insert hole but closer to the primary coating portion, the primary coating portion being bent outside the optical fiber connector is brought into contact with the tapered portion whereby the bending thereof is mitigated. Thus, it is possible to prevent the optical fiber from breaking due to bending.

DETAILED DESCRIPTION

Figure 1:
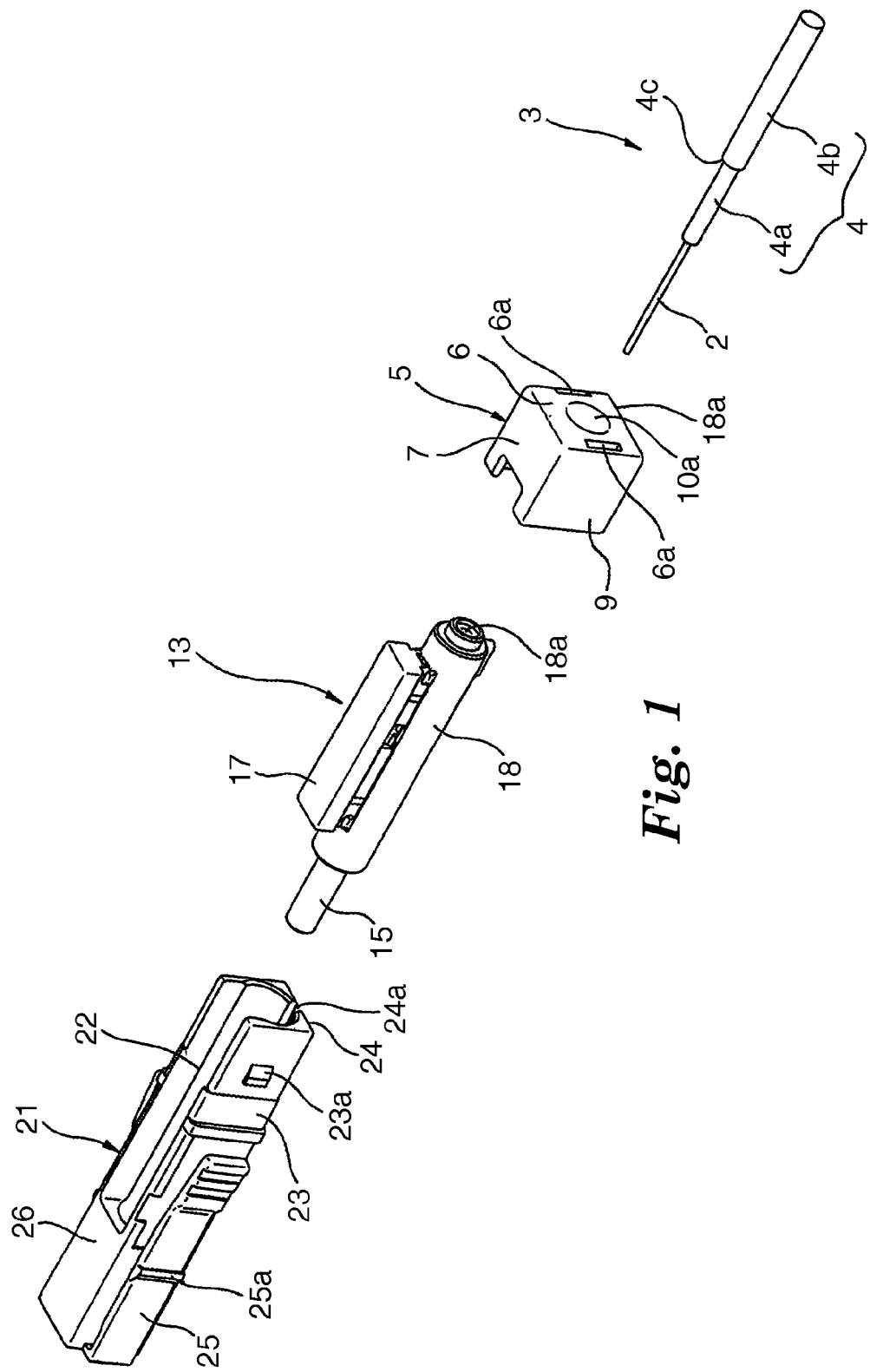
FIG. 1 is an exploded perspective view of one embodiment of an optical fiber connector according to the present invention.
Figure 2:
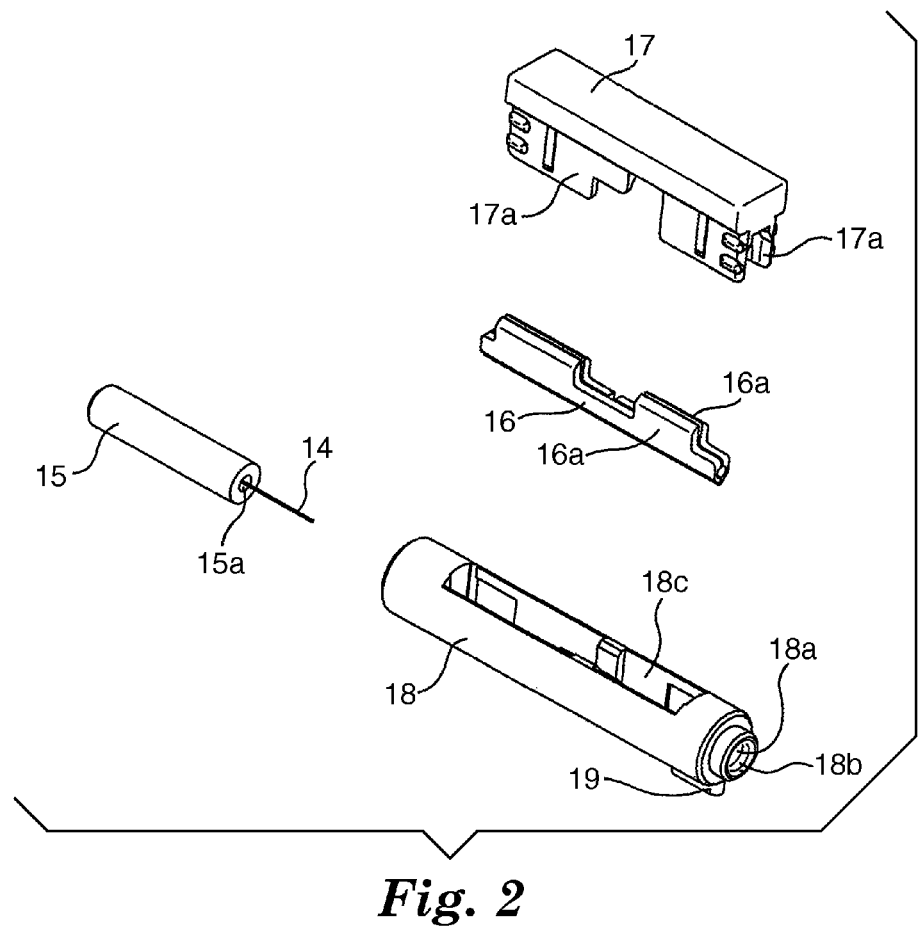
FIG. 2 is an exploded perspective view of a splice assembly shown in FIG. 1.
Figure 3:
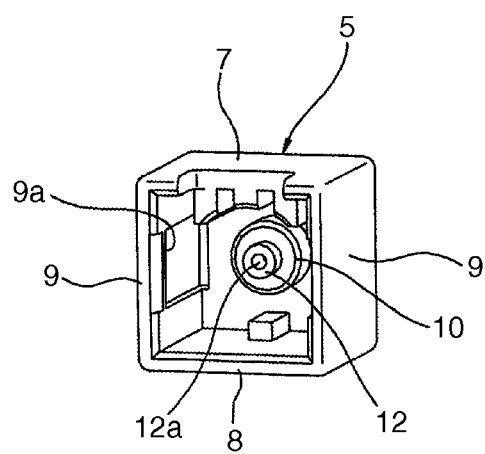
FIG. 3 is a perspective view of an end cap shown in FIG. 1 as seen from an opening side.
Figure 4:
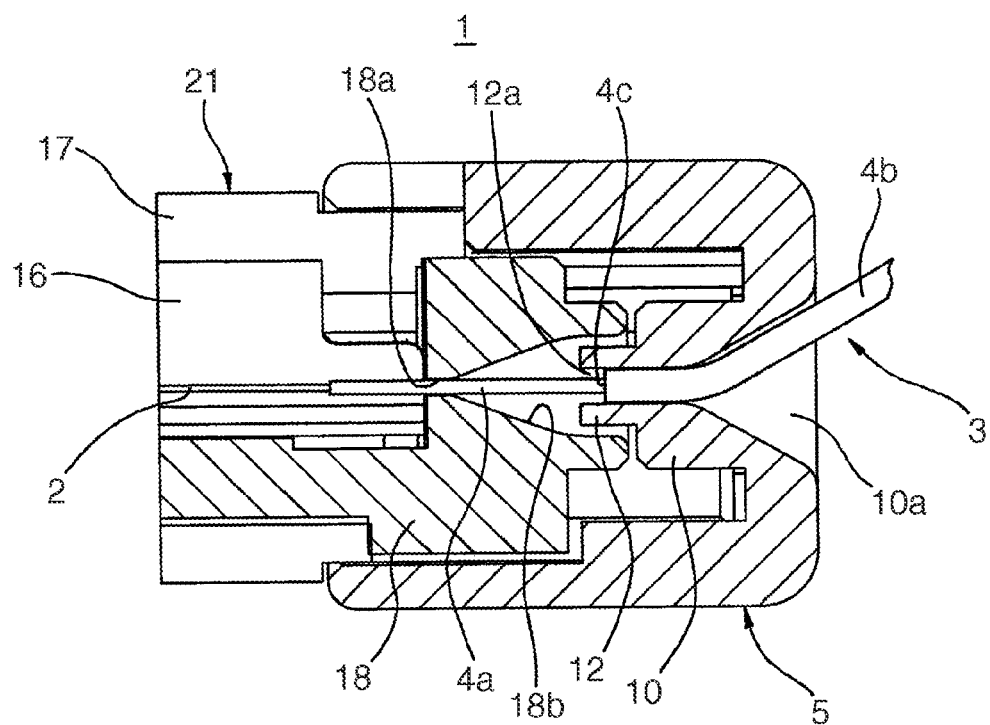
FIG. 4 is a sectional view of part of the inventive optical fiber connector wherein a primary coating portion is bent on a side introducing the same.
Figure 5:
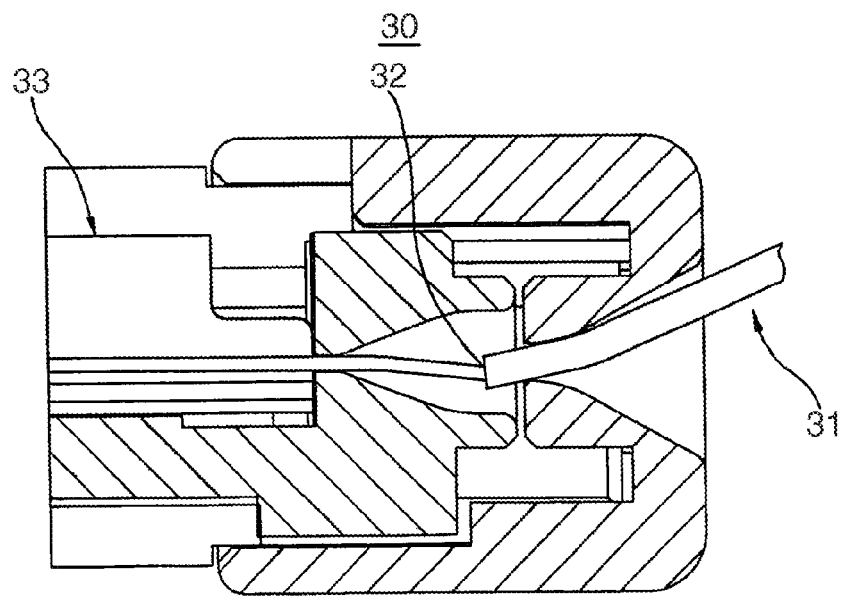
FIG. 5 is a sectional view of part of a prior art optical fiber connector wherein a primary coating portion is bent on a side introducing the same.

The preferred embodiments of the present invention will be described in detail below with reference to the attached drawings. FIG. 1 is an exploded perspective view of one embodiment of the inventive optical fiber connector. The optical fiber connector 1 according to this embodiment includes a primary coating portion 3 formed by covering an outer circumference of a plain fiber portion 2 with an inner coat 4 of a layered structure, an end cap 5 having an insert hole 10a for inserting the primary coating portion 3 therethrough, a splice assembly 13 for abutting end surfaces of the plain fiber portions 2 and optically connecting them, and a connector housing 21 for accommodating the splice assembly 13 therein and engaging with a female type connector housing, not shown, in a mating connector.

The primary coating portion 3 is formed from an optical fiber cable by removing a thick outer cover of a covering layer thereof, and consists of a plain fiber portion (optical glass fiber) and an inner cover 4 of a multi-layered structure covering the optical fiber. The inner cover 4 of a multi-layered structure is formed by repeating a resin coating process on the optical fiber. The plain fiber portion is of a circular cross-section, and has a transparent core at a center thereof for transmitting an optical signal and a transparent clad, on the outside thereof, having a refractive index smaller than that of the core.

The inner cover 4 is formed of two layers of acrylic resin. The covering layer of the inner cover 4 is stripped off from an end thereof to have a boundary 4c in which the thickness of the covering layer changes. The terminal treatment of the primary coating portion 3 is carried out by using a terminal treatment tool, not shown, so that a predetermined length of an outer coating peels off. The primary coating portion 3 abuts an end surface of a mating primary coating portion, in a component 16 of the splice assembly 13, with a predetermined pressure, whereby both the end surfaces are optically connected to each other. In this text, the optical glass fiber is defined as a plain fiber portion 2, and a structure wherein the optical glass fiber is covered with a multi-layered inner cover 4 is defined as a primary coating portion 3.

The end cap 5 of the optical fiber connector is a resin-molded member attached to a rear end of the connector housing 21 so that the splice assembly 13 does not come off from the connector housing 21. One end of the end cap 5 is open and the other end thereof forms a rear wall having an insert hole 10a. The insert hole 10a is gradually enlarged in diameter toward the outer extremity from which the primary coating portion 3 is inserted.

A tubular portion 10 having the insert hole 10a for inserting the primary coating portion 3 is projected from the inner surface of the rear wall 6 while approximately axially communicating with a guiding hole 18a for guiding the primary coating portion 3 from a base member 18. An extension 12 of the tubular portion 10 having a straight hole (strain-restricting portion) 12a is provided at an end of the tubular portion while communicating to the insert hole 10a. The extension 12 is projected into the guiding hole 18a of the base member 18 in the splice assembly 13.

The rear wall 6 has upper and lower wall portions 7, 8 and left and right wall portions 9, 9. A recess 7a engageable with an end of a cap member 17 in the splice assembly 13 is formed in the upper wall portion 7. An engagement groove 9a engageable with a projection 23a provided on the outer surface of a side wall 23 of the connector housing 21 is formed on the inner surface of the respective side wall portion 9. By the engagement of the projection 23a with the engagement groove 9a, the end cap 5 is detachably mounted to the rear end of the connector housing 21. Holes 6a for providing the engagement grooves 9a are formed in the rear wall 6 of the end cap 5.

Terms "front and rear" and "upper and lower" used in this text are defined as follows. A front direction means the direction in which the optical fiber connector 1 moves when it is connected to the mating optical fiber connector. A rear direction means the direction opposite to the above-mentioned connector-engagement direction; i.e., toward the primary coating portion 3 in FIG. 1. A lower direction means the direction toward the base member 18 in the splice assembly 13, and an upper direction means the direction toward the cap member 17 in the splice assembly 13 in the drawings.

The splice assembly 13 of the optical fiber connector 1 includes a ferrule 15 for holding one end of a plain fiber portion 14 while the other end the plain fiber portion 14 projects out therefrom, a component 16 which is an openable/closable element fixing member for connecting the plain fiber portion 14 projected from the other end of the ferrule 15 to the plain fiber portion 2, the cap member 17 for closing a pair of opened bending pieces 16a, 16a in the component 16 to fix the plain fiber portions 2 and 14 between the pair of bending pieces 16a, 16a, and the base member 18 for holding the ferrule 15 and the component 16.

The ferrule 15 in the splice assembly 13 is a tubular member made of resin or ceramic and having a through-hole 15a along a center axis thereof for passing the plain fiber portion 2 therethrough, and the outer circumference of the ferrule 15 is defined as a centering surface for positioning the ferrule 15 on the axis of the mating ferrule. An end surface of the ferrule 15, abutting to that of the mating end surface, is a flat plane vertical to the center axis.

A predetermined length of the connecting plain fiber portion 14 is inserted into the through-hole 15a formed from one end to the other end of the ferrule 15 and fixed by an adhesive. The connecting plain fiber portion 14 is disposed so that the axis thereof coincides with that of the ferrule 15.

Generally speaking, after the connecting plain fiber portion 14 has been inserted into the through-hole 15a of the ferrule 15 and fixed thereto, the end surface of the ferrule 15 is mirror-polished so that the end surface of the connecting plain fiber portion 14 is in the same plane as the end surface of the ferrule 15. The plain fiber portion 2 extended from the other end surface of the ferrule 15 is cut at an optional position by a cutter. The cut surface is a flat plane vertical to the center axis of the ferrule 15.

The other end of the ferrule 15 from which the plain fiber portion 2 extends is press-fit into a hole (not shown) formed at one end of the base member 18, and fixed to be integral with the base member 18 while one end of the ferrule 15 projects out from the base member 18. A divided sleeve not shown is mounted to one end of the ferrule 15 to be positioned on a ferrule in the mating connector.

The component 16 of the splice assembly 13 may be formed by die-cutting an aluminum sheet and folding the same along a center axis. Accordingly, the component 16 has a pair of bent pieces 16a, 16a opposed to each other. One of the pair of bent pieces 16a, 16a has a groove not shown disposed on the same axis as the center axis of the ferrule 15. The pair of bent pieces 16a, 16a are openable/closable about a bent line thereof. By pivoting the pair of bending pieces 16a, 16a in the closing direction against the elastic recovery thereof while positioning the plain fiber portions 2 and 14 so that the end surfaces thereof abut to each other, the plain fiber portions 2 and 14 are fixed together by the grip of the pair of bending pieces 16a, 16a.

The cap member 17 of the splice assembly 13 is made, for example, of resin to have a pair of clipping walls 17a, 17a defining a space for receiving the pair of bent pieces 16a, 16a in the component 16. The pair of clipping walls 17a, 17a are opposed and approximately parallel to each other with a predetermined gap therebetween. On the inner surfaces of the clipping walls 17a, 17a, there are steps, not shown, and a distance between the steps which becomes smaller toward the inner part. Thereby, a force is applied to the pair of bending pieces 16a, 16a of the component 16 in the closing direction to bring the opposed surfaces of the pair of bending pieces 16a, 16a into tight contact with each other. Thus, the closed state of the component 16 is maintained unless the cap member 17 is detached from the component 16.

In the base member 18 of the splice assembly 13, a hole is provided at an end for press-fitting the ferrule 15 therein, and a guiding hole 18a is provided at a rear end for inserting the plain fiber portion 2 thereinto. On the outer circumference of the base member 18, an opening 18c is provided for receiving the component 16 and the cap member 17. An end of the guiding hole 18a forms a tapered portion 18b, a diameter of which increases as going to the open end, so that the plain fiber portion 2 can be smoothly inserted therealong without resistance. The extension 12 of the tubular portion 10 projected from the inner surface of the rear wall 6 of the end cap 5 is inserted into the tapered portion 18b so that the tapered portion 18b is overlapped with the extension 12. Thereby, a strain of the boundary 4c having a step in the primary coating portion 3 introduced from the splice assembly 13 is controlled by the restraint due to the straight hole 12a in the extension 12. Accordingly, even if the primary coating portion 3 introduced out from the optical fiber connector 1 is bent, no stress is concentrated to the boundary 3c, whereby the breakage of the plain fiber portion 2 is avoidable.

The connector housing 21 of the optical fiber connector 1 is molded with resin to have an inner space 22 in the interior thereof for accommodating the splice assembly 13. A front half of the inner space 22 is covered with a tubular portion and a rear half is open in an upper wall 26 of the tubular portion. The ferrule 15 is disposed at a center of the tubular portion in a floating state. In a bottom wall 24 opposed to the upper wall 26 in the rear half, a guide groove 24a is formed to be in slide engagement with a rib 19 of the base member 18.

On the outer surface of each the side walls 23 vertically intersecting the upper wall 26 in the rear half, the projection 23a engageable with the engagement groove 9a on the inner surface of the side wall 9 of the end cap 5 is provided. By the engagement of the groove 9a with the projection 23a, the connector housing 21 becomes one-piece with the end cap 5.

On the outer surface of the side wall 23 in the front half, an elastic arm 25 is provided contiguous to the end of the connector housing 21. The elastic arm 25 is pivotally flexible in the left and right directions about a base thereof. On the outer surface of the elastic arm 25, a projection 25a engageable with the engagement section of the mating connector is provided outward. When the optical fiber connector (a male type connector) 1 is engaged with the mating connector (a female type connector), the elastic arm 25 is flexed in the direction toward the inner surface of the side wall 23, and if the optical fiber connector 1 is further deeply engaged, the elastic arm 25 returns to the original shape due to the elastic recovery of the elastic arm 25, whereby the projection 25a of the elastic arm 25 is engaged with the engagement section of the mating connector to complete the connection of both the connectors.

The present invention should not be limited to the above-mentioned embodiment, but includes other embodiments. For example, while the extension 12 of the tubular portion 10 projected from the inner surface of the rear wall 6 in the end cap 5 is inserted into the guiding hole 18a in the base member 18 in this embodiment, a structure wherein the extension 12 is disposed in the vicinity of the base member 18 may be adopted if the boundary 4c of the primary coating portion 3 is positioned on the outside of the base member 18 and a taper angle of the tapered portion 18b is too small to allow the insert of the extension 12 of the tubular portion 10.

What is claimed is:

1. An optical fiber connector comprising a connector housing having a splice assembly therein, for abutting an end surface of a plain fiber portion, obtained by removing an outer cover and a multi-layered inner cover from an optical fiber cable, to an end surface of a mating plain fiber portion and optically connecting plain fiber portions to each other, and an end cap, attached to one end of said connector housing, from which a primary coating portion, obtained by removing the outer cover of said optical fiber cable while leaving the inner cover thereof, is led out, wherein a boundary formed on said primary coating portion, between a portion of said primary coating portion, obtained by removing an outer coating while leaving an inner coating of the inner cover, and a portion leaving the outer coating of the inner cover, is located in an interior of said connector housing, wherein said end cap is provided in the interior thereof with a tubular portion and an extension extending from an end of said tubular portion, said tubular portion including an insert hole for an insertion of said primary coating portion approximately coaxially with a guiding hole formed in said splice assembly accommodated in said connector housing for guiding said primary coating portion leading out from said splice assembly, said extension including a strain-control hole, communicating with said insert hole, for receiving said boundary of said primary coating portion, and for controlling stress at said boundary.

2. An optical fiber connector as defined by claim 1, wherein said extension is located in said guiding hole.

3. An optical fiber connector as defined by claim 1, wherein said strain-control hole comprises a straight hole.

4. An optical fiber connector as defined by claim 1, wherein a tapered portion is formed on primary coating portion leading out side of said insert hole; said tapered portion having a diameter gradually increasing toward an open end.

* * * * *